US011207993B2

(12) United States Patent
Pfeilschifter et al.

(10) Patent No.: US 11,207,993 B2
(45) Date of Patent: Dec. 28, 2021

(54) STORAGE-BATTERY CHARGING DEVICE FOR A MOTOR VEHICLE, METHOD FOR OPERATING AN ON-BOARD STORAGE-BATTERY CHARGING DEVICE, HIGH-VOLTAGE VEHICLE ELECTRICAL SYSTEM AND USE OF A STORAGE-BATTERY CHARGING DEVICE

(71) Applicant: VITESCO TECHNOLOGIES GMBH, Hannover (DE)

(72) Inventors: Franz Pfeilschifter, Regensburg (DE); Martin Goetzenberger, Ingolstadt (DE)

(73) Assignee: Vitesco Technologies GmbH, Hannover (DE)

( * ) Notice: Subject to any disclaimer, the term of this patent is extended or adjusted under 35 U.S.C. 154(b) by 51 days.

(21) Appl. No.: 16/637,396

(22) PCT Filed: Aug. 2, 2018

(86) PCT No.: PCT/EP2018/071075
§ 371 (c)(1),
(2) Date: Feb. 7, 2020

(87) PCT Pub. No.: WO2019/030125
PCT Pub. Date: Feb. 14, 2019

(65) Prior Publication Data
US 2020/0180453 A1 Jun. 11, 2020

(30) Foreign Application Priority Data
Aug. 7, 2017 (DE) .................. 10 2017 213 682

(51) Int. Cl.
*B60L 53/22* (2019.01)
*H02M 1/42* (2007.01)
(Continued)

(52) U.S. Cl.
CPC ............... *B60L 53/22* (2019.02); *B60L 53/14* (2019.02); *B60L 58/20* (2019.02); *H02M 1/4216* (2013.01); *B60L 2210/42* (2013.01)

(58) Field of Classification Search
CPC ......... B60L 53/22; B60L 53/14; B60L 58/20; B60L 2210/42; H02M 1/4216
(Continued)

(56) References Cited

U.S. PATENT DOCUMENTS 7,889,524 B2 * 2/2011 Lee et al. ............... B60L 53/22
363/65
8,354,818 B2 1/2013 Louch et al.
(Continued)

FOREIGN PATENT DOCUMENTS

DE 102006026404 A1 12/2007
DE 102010040239 A1 3/2012
(Continued)

*Primary Examiner* — Sun J Lin
(74) *Attorney, Agent, or Firm* — Laurence A. Greenberg; Werner H. Stemer; Ralph E. Locher

(57) ABSTRACT

A storage-battery charging device for a motor vehicle is configured to be arranged in the motor vehicle. The storage-battery charging device includes a first stage with a power factor correction filter, and a second stage with an inverter. The first stage is electrically connected to the second stage through an intermediate node, the intermediate node being directly electrically connected to a feed-in connection point for direct voltage. The feed-in connection point is designed for direct electrical coupling to a high-voltage vehicle electrical system of the motor vehicle.

20 Claims, 5 Drawing Sheets

(51) Int. Cl.
*B60L 53/14* (2019.01)
*B60L 58/20* (2019.01)

(58) Field of Classification Search
USPC .......................................... 320/104
See application file for complete search history.

(56) References Cited

U.S. PATENT DOCUMENTS

| | | | |
|---|---|---|---|
| 8,378,623 B2* | 2/2013 | Kusch et al. | B60L 50/40 320/104 |
| 8,723,487 B2* | 5/2014 | Pahlevaninezhad et al. | H02M 3/1584 323/225 |
| 8,896,263 B2* | 11/2014 | Riggio et al. | H02J 7/022 320/107 |
| 9,257,864 B2* | 2/2016 | Pahlevaninezhad et al. | H02J 7/022 |
| 9,656,558 B2* | 5/2017 | Weber et al. | H02J 7/022 |
| 9,748,795 B2 | 8/2017 | Jung et al. | |
| 9,758,047 B2* | 9/2017 | Hou et al. | B60L 11/1811 |
| 9,931,951 B2* | 4/2018 | Khaligh et al. | H02M 3/33584 |
| 10,020,658 B2 | 7/2018 | Purcarea et al. | |
| 10,367,363 B2 | 7/2019 | Tritschler et al. | |
| 10,773,594 B2* | 9/2020 | Kratzer | H01M 10/441 |
| 10,991,962 B2* | 4/2021 | Kemmer et al. | H01M 8/04223 |
| 2014/0091750 A1* | 4/2014 | Ikeda | B60L 58/20 320/104 |
| 2014/0159478 A1 | 6/2014 | Ang | |
| 2015/0028811 A1 | 1/2015 | Krammer et al. | |
| 2016/0016479 A1 | 1/2016 | Khaligh et al. | |
| 2016/0236580 A1 | 8/2016 | Hou et al. | |

FOREIGN PATENT DOCUMENTS

| | | |
|---|---|---|
| DE | 102011003543 A1 | 8/2012 |
| DE | 102011107628 A1 | 1/2013 |
| DE | 102012203612 A1 | 9/2013 |
| DE | 102013201637 A1 | 7/2014 |
| DE | 102014217703 A1 | 3/2016 |
| DE | 102016203830 A1 | 8/2017 |
| JP | H099417 A | 1/1997 |
| JP | 2001275201 A | 10/2001 |
| JP | 2011501013 A | 1/2011 |
| JP | 2013085394 A | 5/2013 |
| WO | 2013030941 A1 | 3/2013 |
| WO | 2013046315 A1 | 4/2013 |
| WO | 2017022478 A1 | 2/2017 |

* cited by examiner

STORAGE-BATTERY CHARGING DEVICE FOR A MOTOR VEHICLE, METHOD FOR OPERATING AN ON-BOARD STORAGE-BATTERY CHARGING DEVICE, HIGH-VOLTAGE VEHICLE ELECTRICAL SYSTEM AND USE OF A STORAGE-BATTERY CHARGING DEVICE

BACKGROUND OF THE INVENTION

Field of the Invention

The invention relates to a storage-battery charging device for a motor vehicle. The storage-battery charging device is designed for arrangement in the motor vehicle. Furthermore, the storage-battery charging device has a first stage, which has a power correction filter, and the storage-battery charging device has a second stage, which has an inverter. The first stage is electrically connected to the second stage via an intermediate point. The invention also relates to a method for operating a corresponding on-board storage-battery charging device for a motor vehicle. Further, the invention also relates to a high-voltage vehicle electrical system for a motor vehicle, having a corresponding on-board storage-battery charging device. Moreover, the invention relates to a use of a storage-battery charging device.

Storage-battery charging devices are known. In the present case, the invention relates to a storage-battery charging device for AC voltage that is installed in the motor vehicle. The storage-battery charging device usually has a motor-vehicle-external AC voltage source connected to it in order to charge a high-voltage storage battery of the motor vehicle. The high-voltage storage battery is used for example to supply power to a traction unit of the motor vehicle. The storage-battery charging device installed in the motor vehicle can also be referred to as an OBC (On-Board Charger).

SUMMARY OF THE INVENTION

It is an object of the present invention to provide a storage-battery charging device, a method, a high-voltage vehicle electrical system and a use of a storage-battery charging device that allow more feature-rich use of the storage-battery charging device.

This object is achieved by means of a storage-battery charging device, a method, a high-voltage vehicle electrical system and a use in accordance with the independent claims.

A storage-battery charging device according to the invention for a motor vehicle is designed for arrangement in the motor vehicle. The storage-battery charging device has a first stage, which has a power factor correction filter, and the storage-battery charging device has a second stage, which has an inverter. The first stage is electrically connected to the second stage, in particular only, via an intermediate point. An important concept provided for is that the intermediate point is electrically connected directly to a supply connection of the storage-battery charging device, which supply connection is configured for direct electrical coupling to a high-voltage vehicle electrical system of the motor vehicle.

The invention is based on the insight that the storage-battery charging device can be used not only for its function as a rectifier but also as a DC-DC voltage converter. In particular, the second stage of the storage-battery charging device can be used as a DC-DC voltage converter.

The use of the storage-battery charging device as a DC-DC voltage converter is advantageous because it is then possible to dispense with a separate DC-DC voltage converter in the high-voltage vehicle electrical system of the motor vehicle. As a result of the supply connection, the storage-battery charging device is thus designed to perform the function of a DC-DC voltage converter.

The use of the second stage as a DC-DC voltage converter is particularly advantageous because a transformer arranged in particular in the second stage means that the second stage provides galvanic isolation between the supply connection and an output connection of the second stage. The galvanic isolation allows for example a 400 V side to be safely connected to an 800 V side. As such, for example the supply connection can carry a voltage of 400 V, while the output connection carries a voltage of 800 V. In specific fault situations, such as for example a broken down semiconductor switch that results in an unwanted continuously-on, the consequences for the high-voltage vehicle electrical system are therefore less severe than if the first stage of the storage-battery charging device were to be used for DC-DC voltage conversion.

The supply connection is in particular designed only for supplying DC voltage. The supply connection can be in the form of a plug connector, for example.

Preferably, there is provision for the intermediate point to be electrically connected directly to the inverter of the second stage. The inverter is in particular in the form of a first inverter of the second electrical stage and is therefore arranged, in the second stage, upstream of a further inverter of the second stage and/or of a transformer of the second stage with reference to the supply connection. The intermediate point can be arranged for example on a connecting line between the first stage and the second stage or else directly at the inverter of the second stage. As a result of the intermediate point being arranged directly at the inverter, the storage-battery charging device is operated more effectively because a shorter line is needed for the supply connection and thus interference inductances end up being lower.

Furthermore, there is preferably provision for the second stage to be electrically connected, in particular directly, to an output connection on a side of the second stage that is remote from the intermediate point, wherein the second stage is configured to provide a second voltage, different than a first DC voltage, while the intermediate point is coupled to the first DC voltage. Preferably, the second electrical stage has an inverter and a rectifier, which are electrically connected to one another via a transformer. The two converters allow the second stage to output or provide the second DC voltage when the first DC voltage is input. Preferably, the storage-battery charging device is used to step up DC voltage. Accordingly, the second DC voltage is preferably larger, in particular twice as high, than the first DC voltage. The first DC voltage can be for example 400 V, while the second DC voltage can be for example 800 V.

Furthermore, there is preferably provision for the first stage to have a rectifier, which is arranged upstream of the power factor correction filter with reference to the intermediate point. In particular, the storage-battery charging device is in the form of an AC voltage storage-battery charging device. In particular a motor-vehicle-external AC voltage source is thus connected to the storage-battery charging device. This AC voltage from the motor-vehicle-external AC voltage source is initially routed to the rectifier of the first stage and then immediately to the power factor correction filter. The first stage of the storage-battery charging device is preferably not used for DC-DC voltage conversion because the first stage has no transformer and therefore cannot provide galvanic isolation.

Furthermore, there is preferably provision for the second stage to have a transformer, which is arranged downstream of the inverter with reference to the intermediate point, and/or a rectifier, which is arranged downstream of the inverter with reference to the intermediate point. The transformer provides galvanic isolation between the intermediate point and the output connection. The storage-battery charging device is thus operated more safely. The rectifier of the second stage converts the AC voltage predominant on the transformer into DC voltage again.

Furthermore, there is preferably provision for the side of the first stage that is remote from the intermediate point to be electrically connected to a charging connection for AC voltage, which charging connection is configured to be electrically connected directly to a motor-vehicle-external AC voltage source. The charging connection is in particular also designed for polyphase connection of an AC voltage, in particular three-phase AC voltage, or is in the form of a three-phase connection. The charging connection can be in the form of a plug connection, for example. The motor-vehicle-external AC voltage source can be in the form of a public charging column, for example.

Furthermore, there is preferably provision for the first stage and the second stage to be electrically connected by a capacitor and for the intermediate point to be arranged between the capacitor and the second stage. As a result of the intermediate point being arranged between the capacitor and the second stage, the first DC voltage is thus supplied closer to the inverter of the second stage than would be the case if the intermediate point were arranged between the first stage and the capacitor. The capacitor is in particular in the form of a parallel-connected capacitor or in the form of a smoothing capacitor. The capacitor forms a low-pass filter, which is grounded. The capacitor allows AC voltage components to be dissipated to ground.

However, it may also be the case that the intermediate point is arranged between the first stage and the capacitor.

Furthermore, there is preferably provision for the second stage to have three phases and for the intermediate point, and in particular the output connection, to be electrically connected only to one of the three phases. As a result, just one of the three phases of the second stage is used for the DC-DC voltage conversion or DC voltage matching. This is advantageous because fewer electrical connections are needed than if two or three phases of the second stage were to be used for matching the DC voltage.

Alternatively, there may preferably also be provision, however, for the second stage to have three phases and for the intermediate point, and in particular the output connection, to be electrically connected to at least two of the three phases. The connecting of the intermediate point to at least two of the three phases allows multiple phases of the second stage to be used for voltage matching or DC voltage matching. The advantage of using the at least two phases is that DC voltage at a higher power can be matched. By way of example, the second stage of the storage-battery charging device, if the intermediate point is electrically connected only to one of the phases, is designed just for a power of substantially 3.6 kW DC, while the second stage can be designed for up to 11 kW DC when the intermediate point is connected to all three phases.

A method according to the invention involves an on-board storage-battery charging device for a motor vehicle being operated. A first DC voltage from a high-voltage vehicle electrical system of the motor vehicle is coupled into the storage-battery charging device at a supply connection of the storage-battery charging device and is routed onward, in particular directly, via an intermediate point to a second stage of the storage-battery charging device. The first DC voltage is matched in the second stage to a second DC voltage, which is different than the first DC voltage, and, in particular, the second DC voltage is provided at an output connection of the storage-battery charging device after the matching.

Preferably, the storage-battery charging device is operated—besides for its actual function as an AC voltage charging device for a high-voltage storage battery of the motor vehicle—to step up DC voltage. The first DC voltage is thus stepped up in the second stage to produce the second DC voltage. Preferably, the first DC voltage is set to up to twice as high, which means that the second DC voltage is then up to twice as large as the first DC voltage.

More preferably, the second stage can also be controlled in regard to a setpoint output voltage of the storage-battery charging device. As such, the setpoint output voltage can be set or prescribed as the second DC voltage, for example. The second stage, in particular the rectifier of the second stage, can to this end be regulated on the basis of a control signal such that the setpoint output voltage is provided at the output connection.

The invention also relates to a high-voltage vehicle electrical system for a motor vehicle. The high-voltage vehicle electrical system has an on-board storage-battery charging device according to the invention. The motor vehicle is preferably in the form of a passenger car. The motor vehicle can be in the form of a pure electric vehicle or else a hybrid vehicle, for example.

Preferably, there is provision for a supply connection of the storage-battery charging device to be electrically connected directly to a supply switch of the high-voltage vehicle electrical system. The supply switch can then be used to control whether a second stage of the storage-battery charging device is supposed to be used for matching DC voltage. When the supply switch is closed, preferably a first DC voltage is supplied to the second stage, and, in particular, a second DC voltage is then provided at an output connection of the second stage. The supply switch is preferably in the form of a contactor.

Furthermore, the supply switch is preferably in the form of a positive and negative switch, so that positive and negative can be disconnected at the same time. The supply switch thus allows in particular all-pole interruption or disconnection.

Furthermore, there is preferably provision for the supply switch to be electrically connected, in particular directly, to a DC charging line, which is electrically couplable directly to a motor-vehicle-external DC voltage source, on a side of the supply switch that is remote from the storage-battery charging device. The coupling of the supply switch to the DC charging line allows for example DC current from the DC voltage source to be routed directly to the supply connection without great effort. This is advantageous if the DC voltage source provides only 400 V, for example, but 800 V are needed in the high-voltage vehicle electrical system, for example for high-voltage loads.

Furthermore, there is preferably provision for the supply switch to be electrically connected, in particular directly and/or in particular without a switch, to a high-voltage storage battery of the high-voltage vehicle electrical system on a side of the supply switch that is remote from the storage-battery charging device.

Furthermore, there is preferably provision for the supply switch to be electrically connected, in particular directly and/or in particular without a switch, to a high-voltage vehicle electrical system branch, which has at least one high-voltage load, of the high-voltage vehicle electrical system on a side of the supply switch that is remote from the storage-battery charging device. The high-voltage load can be in the form of a heating unit or air-conditioning compressor, for example. In particular, the high-voltage vehicle electrical system branch is in the form of an unstabilized vehicle electrical system branch.

In addition, the invention also relates to a use of a second stage of an on-board storage-battery charging device as a DC-DC voltage converter for converting DC voltage supplied to the storage-battery charging device via a supply connection of the storage-battery charging device, which supply connection is connected directly to an intermediate point of the storage-battery charging device, wherein the intermediate point is arranged between the second stage and a first stage of the storage-battery charging device.

The use of the storage-battery charging device of the motor vehicle, which is in the form of an AC voltage charging device, for DC voltage matching or DC-DC voltage conversion involves a first DC voltage from a high-voltage vehicle electrical system of the motor vehicle being supplied, in particular only, to the second stage of the storage-battery charging device, and a second DC voltage is output from, in particular the second stage of, the storage-battery charging device.

Advantageous embodiments of the storage-battery charging device can be regarded as advantageous embodiments of the method and of the high-voltage vehicle electrical system. The relevant components of the storage-battery charging device and of the high-voltage vehicle electrical system are each designed to perform the respective method steps.

In the present case, directly electrically connected means in particular that there is a connection without a change of voltage level or current type. Furthermore, directly electrically connected means in particular that the connection exists without a switch, without a converter and without an inverter.

Further features of the invention emerge from the claims, the figures and the description of the figures. The features and combinations of features mentioned in the description above and the features and combinations of features mentioned in the description of the figures below and/or shown in the figures alone can be used not only in the respectively stated combination, but also in other combinations or on their own without departing from the scope of the invention.

Exemplary embodiments of the invention will be explained in more detail below on the basis of schematic drawings.

DETAILED DESCRIPTION OF THE INVENTION

In the figures, identical or functionally identical elements are provided with identical reference signs.

Figure 1:
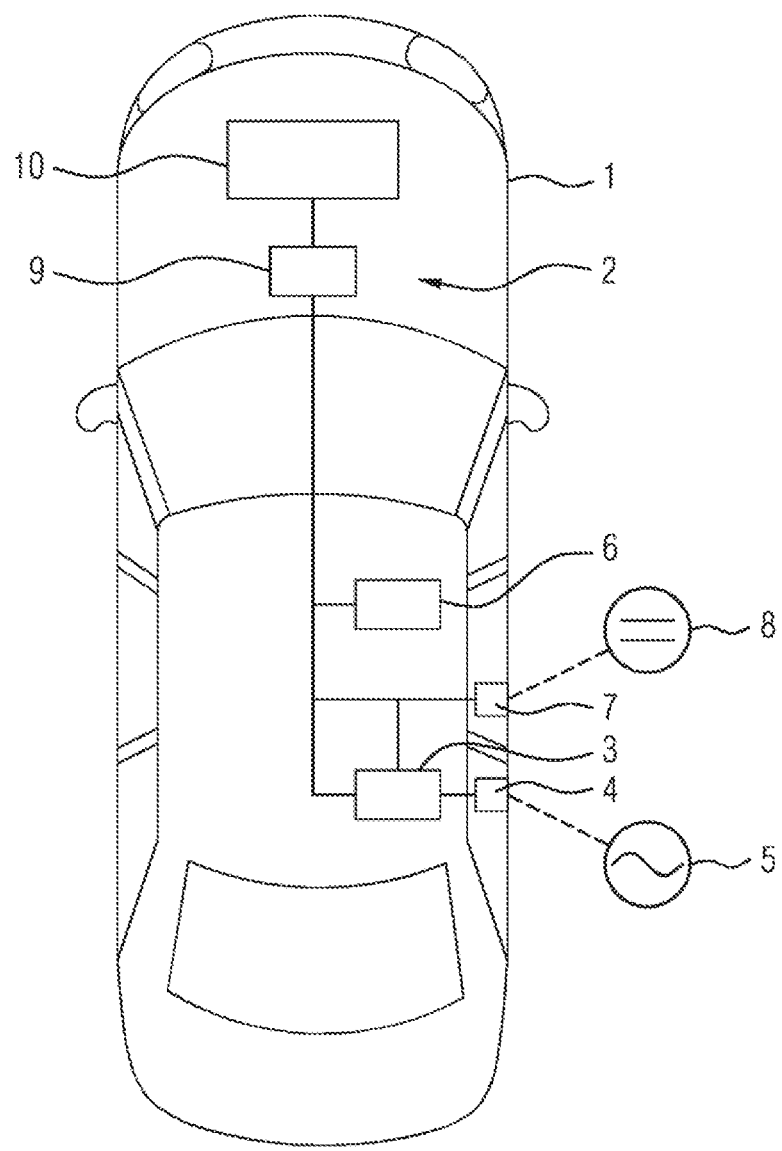
FIG. 1 shows a schematic plan view of a motor vehicle having an exemplary embodiment of a high-voltage vehicle electrical system according to the invention with a storage-battery charging device.

FIG. 1 shows a schematic plan view of a motor vehicle 1 having a high-voltage vehicle electrical system 2. The high-voltage vehicle electrical system 2 has a storage-battery charging device 3. The storage-battery charging device 3 is in the form of a motor-vehicle-internal AC voltage storage-battery charging device. For this purpose, the storage-battery charging device 3 has a charging connection 4. The charging connection 4 is designed to be electrically connected to an AC voltage source 5 directly and without a rectifier. The AC voltage source 5 is arranged externally to the motor vehicle and can be for example in the form of a public charging column or else in the form of a private house connection.

Furthermore, the high-voltage vehicle electrical system 2 has a high-voltage storage battery 6. The high-voltage storage battery 6 can be for example in the form of a lithium-ion storage battery. Preferably, the high-voltage storage battery 6 is in the form of a switchable storage battery that can be operated at a rated voltage of 400 V or 800 V. As such, the high-voltage storage battery 6 can have for example two storage battery units that can be connected in parallel or in series. By connecting the storage battery units in parallel, the high-voltage storage battery 6 will then be operated at 400 V, for example. Alternatively, the high-voltage storage battery 6 can be operated at 800 V by connecting the storage battery units in series.

According to the exemplary embodiment, the high-voltage vehicle electrical system 2 also has a DC voltage charging connection 7. The DC voltage charging connection 7 is designed to be electrically connected directly to a motor-vehicle-external DC voltage source 8. The DC voltage charging connection 7 is connected to the DC voltage source 8 in particular without voltage matching. The DC voltage source 8 can be in the form of a public DC voltage charging column, for example.

Furthermore, the high-voltage vehicle electrical system 2 according to the exemplary embodiment also has a traction inverter 9 and a traction unit 10. The traction unit 10 is in particular in the form of a main drive unit of the motor vehicle 1.

Figure 2:
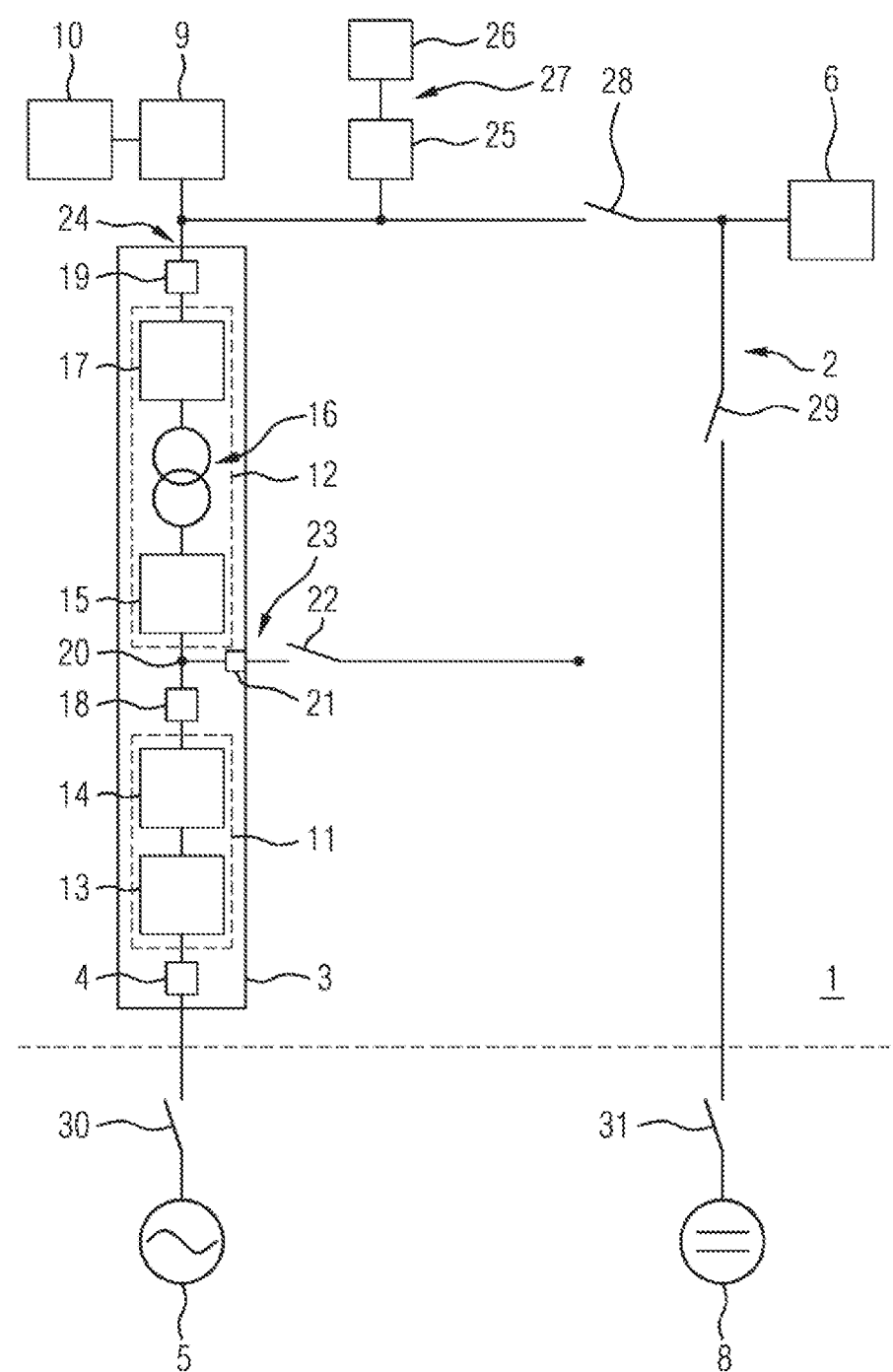
FIG. 2 shows a schematic depiction of a further exemplary embodiment of the high-voltage vehicle electrical system with the storage-battery charging device.

FIG. 2 shows an exemplary embodiment of the storage-battery charging device 3 with an exemplary embodiment of the high-voltage vehicle electrical system 2.

The storage-battery charging device 3 has a first stage 11 and a second stage 12. According to the exemplary embodiment, the first stage 11 comprises a rectifier 13 and a power factor correction filter 14. The rectifier 13 is arranged upstream of the power factor correction filter 14 with reference to the charging connection 4 of the storage-battery charging device 3.

The second stage 12 of the storage-battery charging device 3 has an inverter 15, a transformer 16 and a rectifier 17.

The first stage 11 and the second stage 12 have a capacitor 18 arranged between them. The capacitor 18 electrically connects the first stage 11 and the second stage 12 to one another. The capacitor 18 is a parallel-connected capacitor or in the form of a smoothing capacitor and depicted symbolically as a box in the present case.

By virtue of a side of the storage-battery charging device 3 that is opposite from the charging connection 4, the storage-battery charging device 3 has an output connection 19. The output connection 19 is electrically connected directly to the rectifier 17 of the second stage 12.

Furthermore, the first stage 11 is electrically connected to the second stage 12 via an intermediate point 20. According to the exemplary embodiment, the intermediate point 20 is arranged between the capacitor 18 and the second stage 12. In particular the capacitor 18, the inverter 15 and a supply connection 21 are therefore connected directly to the intermediate point 20. The supply connection 21 can be for example in the form of a plug connection and is designed to be supplied with DC voltage from the high-voltage vehicle electrical system 2 or to be electrically coupled to the high-voltage vehicle electrical system 2 directly and without voltage matching. As seen from the intermediate point 20, the supply connection is followed by a supply switch 22. The supply switch 22 is designed to interrupt or allow, or enable, the supply of DC current via the supply connection 21.

The supply connection 21 is used to supply a first DC voltage 23 to the storage-battery charging device 3 if the supply switch 22 is closed. The first DC voltage 22 is then matched, in particular stepped up, by the second stage 12 and finally provided at the output connection 19 as a second DC voltage 24. As a result, the second stage 12 is thus used to match DC voltage from the high-voltage vehicle electrical system 2. Matching of the DC voltage may be necessary for example if the DC voltage source 8 provides just an unsuitable voltage for the traction inverter 9, the traction unit 10 or the high-voltage storage battery 6, for example. Alternatively, it may be that the high-voltage storage battery 6 cannot provide the DC voltage that is consistent with a rated voltage design of the traction inverter 9 or of the traction unit 10. As such, the high-voltage storage battery 6 can be formed by two storage battery units, for example, which are connected in series or in parallel, for example. If for example one of the two storage battery units fails, the high-voltage storage battery 6 can nevertheless still be operated with one storage battery unit, but can then provide only 400 V instead of 800 V, for example.

According to the exemplary embodiment, the high-voltage vehicle electrical system 2 also has a low DC-DC voltage converter 25. The low DC-DC voltage converter 25 steps down the DC voltage of the high-voltage vehicle electrical system 2, which means that a low-voltage load 26 can be supplied with low-voltage 27. The low voltage 27 is in particular 12 V.

Furthermore, the high-voltage vehicle electrical system 2 according to the exemplary embodiment has a first switch 28 and a second switch 29. The first switch 28 is arranged between the output connection 19 and the high-voltage storage battery 6. By contrast, the second switch 29 is arranged between the supply switch 22 and the high-voltage storage battery 6. The first switch 28 allows a direct connection between the traction inverter 9 and the high-voltage storage battery 6 to be interrupted. The connection can then be made from the high-voltage storage battery 6 to the traction inverter 9 for example via the closed second switch 29, the closed supply switch 22 and the second stage 12.

The second switch 29 can be used to interrupt a direct connection between the DC voltage source 8 and the high-voltage storage battery 6. The connection can then alternatively be made for example via the closed supply switch 22, the second stage 12 and the closed first switch 28. Provision is made for this if the high-voltage storage battery 6 is operated at 800 V and the DC voltage source 8 can only provide 400 V, for example.

The first stage 11 and the second stage 12 of the storage-battery charging device 3 can be arranged for example in a common housing or else each separately or else in different partial housings. The charging connection 4 can also be arranged for example in the housing of the storage-battery charging device 3 or else outside the housing and then electrically connected to the first stage 11 by means of a power line. The supply connection 21 or the output connection 19 can also be arranged for example outside or inside the housing of the storage-battery charging device 3. The supply switch 22 can also be arranged for example outside or inside the housing of the storage-battery charging device 3. The storage-battery charging device 3 can for example also be in a form without a housing or have a separate housing for each individual part. Preferably, however, the storage-battery charging device 3 is of compact design, so that the constituent parts of the storage-battery charging device 3 are arranged as close to one another as possible and so as to save as much installation space as possible.

According to the exemplary embodiment, the AC voltage source 5 is connectable to the high-voltage vehicle electrical system 2 via an AC voltage switch 30. According to the exemplary embodiment, the DC voltage source 8 is also electrically connectable to the high-voltage vehicle electrical system 2 via a DC voltage switch 31.

According to FIG. 2, the box with the reference sign 3 can thus be seen as a boundary, or in particular housing, of the storage-battery charging device 3, while the other solid lines can be seen as electrical lines. The electrical lines are in particular of polyphase design.

Figure 3:
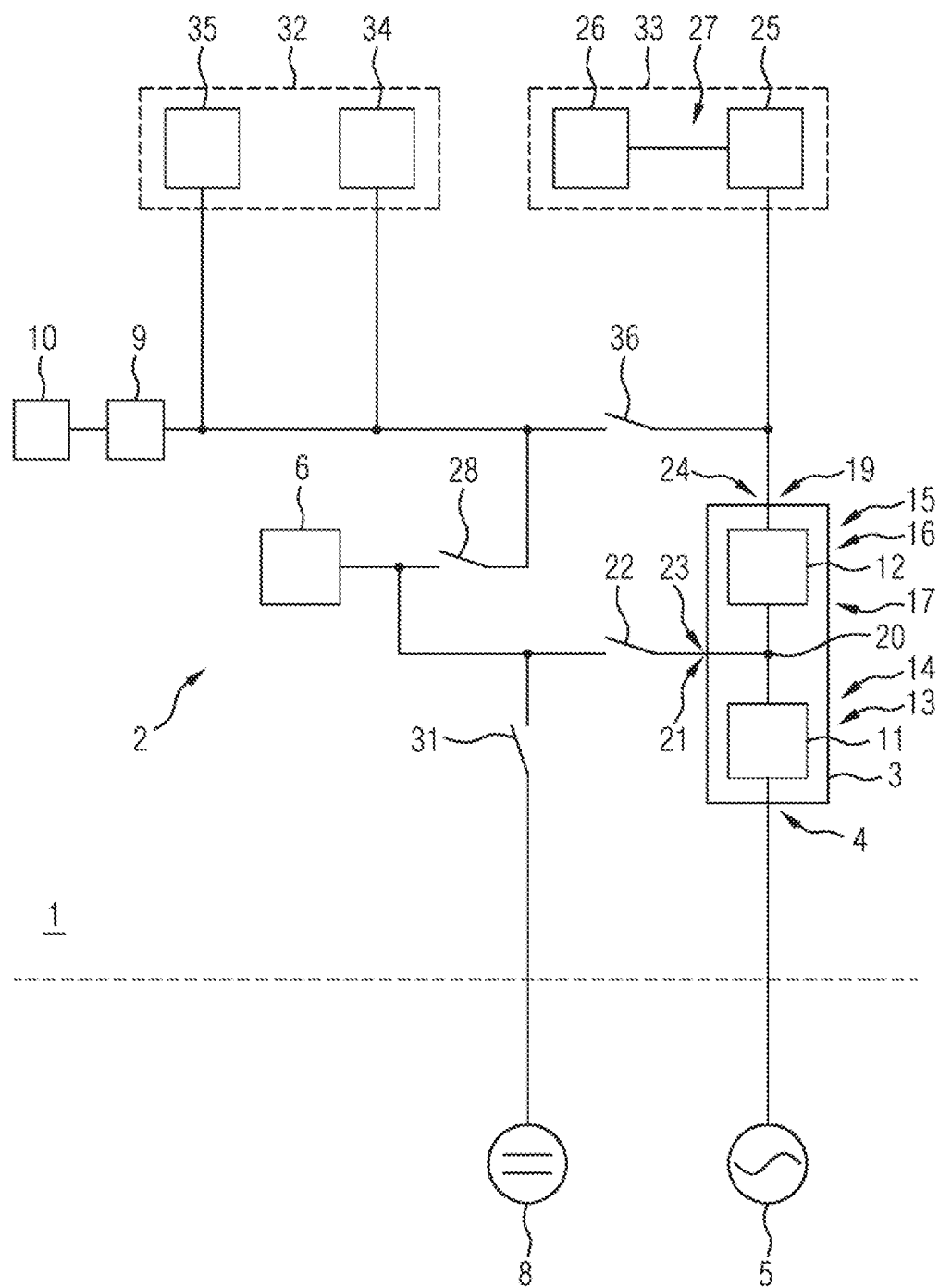
FIG. 3 shows a schematic depiction of a further exemplary embodiment of the high-voltage vehicle electrical system with the storage-battery charging device, wherein a supply switch of the storage-battery charging device is electrically connected directly to a high-voltage storage battery of the high-voltage vehicle electrical system.

FIG. 3 shows a further exemplary embodiment of the high-voltage vehicle electrical system 2 with a first vehicle electrical system branch 32 and a second vehicle electrical system branch 33. According to the exemplary embodiment, the first vehicle electrical system branch 32 comprises a heating unit 34 and an air-conditioning compressor 35. The first vehicle electrical system branch 32 can have further high-voltage loads. The second vehicle electrical system branch 33 comprises the low DC-DC voltage converter 25 and the low-voltage load 26. The second vehicle electrical system branch 33 can also have further low-voltage loads.

According to the exemplary embodiment, the first vehicle electrical system branch 32 is in the form of an unstabilized vehicle electrical system branch and the second vehicle electrical system branch 33 is in the form of a stabilized vehicle electrical system branch. A vehicle electrical system is stabilized if a connected DC-DC voltage converter can be used to variably set a voltage for said vehicle electrical system that differs from the rated voltage of the high-voltage storage battery 6.

According to the exemplary embodiment, there is provision for the second vehicle electrical system branch 33, i.e. the stabilized vehicle electrical system branch, not to be electrically connected to the charging connection 4. In particular, there is provision for the intermediate point 20 not to be directly electrically connected to the second vehicle electrical system branch 33. For this purpose, the second vehicle electrical system branch 33 is isolable from the first vehicle electrical system branch 32 via a third switch 36. The third switch 36 thus allows the second vehicle electrical system branch 33 to be isolated from the high-voltage vehicle electrical system 22. This is useful in particular if the supply switch 22 and the first switch 28 are closed. The open third switch 36 then interrupts a direct electrical connection between the intermediate point 20 and the second vehicle electrical system branch 33.

According to the exemplary embodiment, the supply switch 22 is thus electrically connected to the high-voltage storage battery 6 directly and without a switch.

Figure 4:
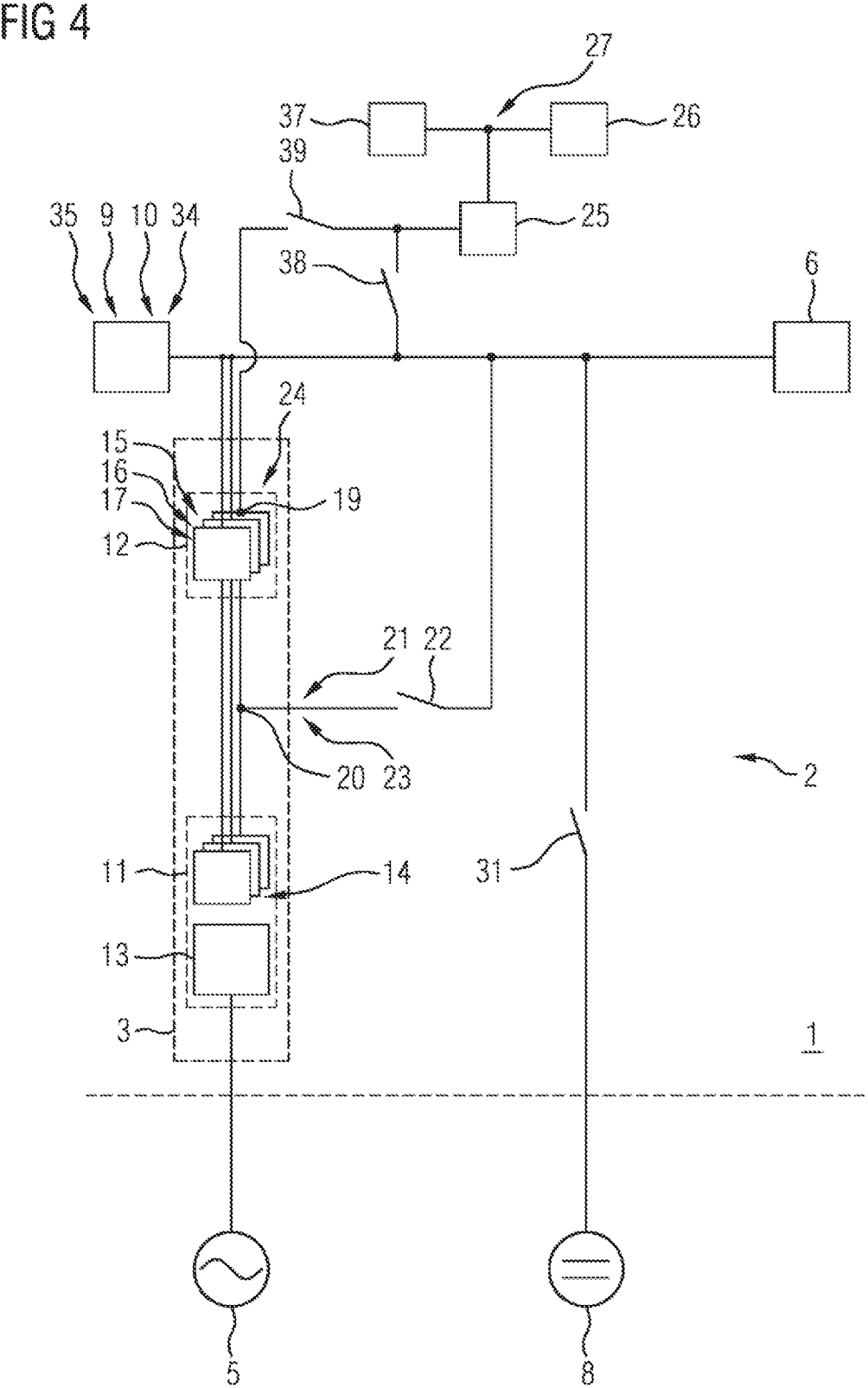
FIG. 4 shows a schematic depiction of a further exemplary embodiment of the high-voltage vehicle electrical system with the storage-battery charging device, wherein the supply switch is electrically connected directly to a high-voltage vehicle electrical system branch of the high-voltage vehicle electrical system.

FIG. 4 shows a further exemplary embodiment of the high-voltage vehicle electrical system 2. According to the exemplary embodiment, the second stage 12 has three phases and the intermediate point 20 and preferably also the output 19 are electrically connected only to one phase of the three phases of the second stage 12.

In the second stage 12, there are, according to the exemplary embodiment, the inverter 15, the transformer 16 and the rectifier 17 of the second stage 12 for a respective one of the three phases.

Furthermore, according to the exemplary embodiment, the low DC-DC voltage converter 25 has a low-voltage storage battery 37 connected to it. The low-voltage storage battery 37 is preferably in the form of a 12-V storage battery.

The high-voltage vehicle electrical system 2 according to the exemplary embodiment has a fourth switch 38 and a fifth switch 39. The fourth switch 38 is arranged in the high-voltage vehicle electrical system 2 such that a direct electrical connection between the low DC-DC voltage converter 25 and the high-voltage storage battery 6 can be interrupted. By contrast, the fifth switch 39 is arranged in the high-voltage vehicle electrical system 2 such that a direct electrical connection between the output connection 19 and the low DC-DC voltage converter 25 can be interrupted.

Figure 5:
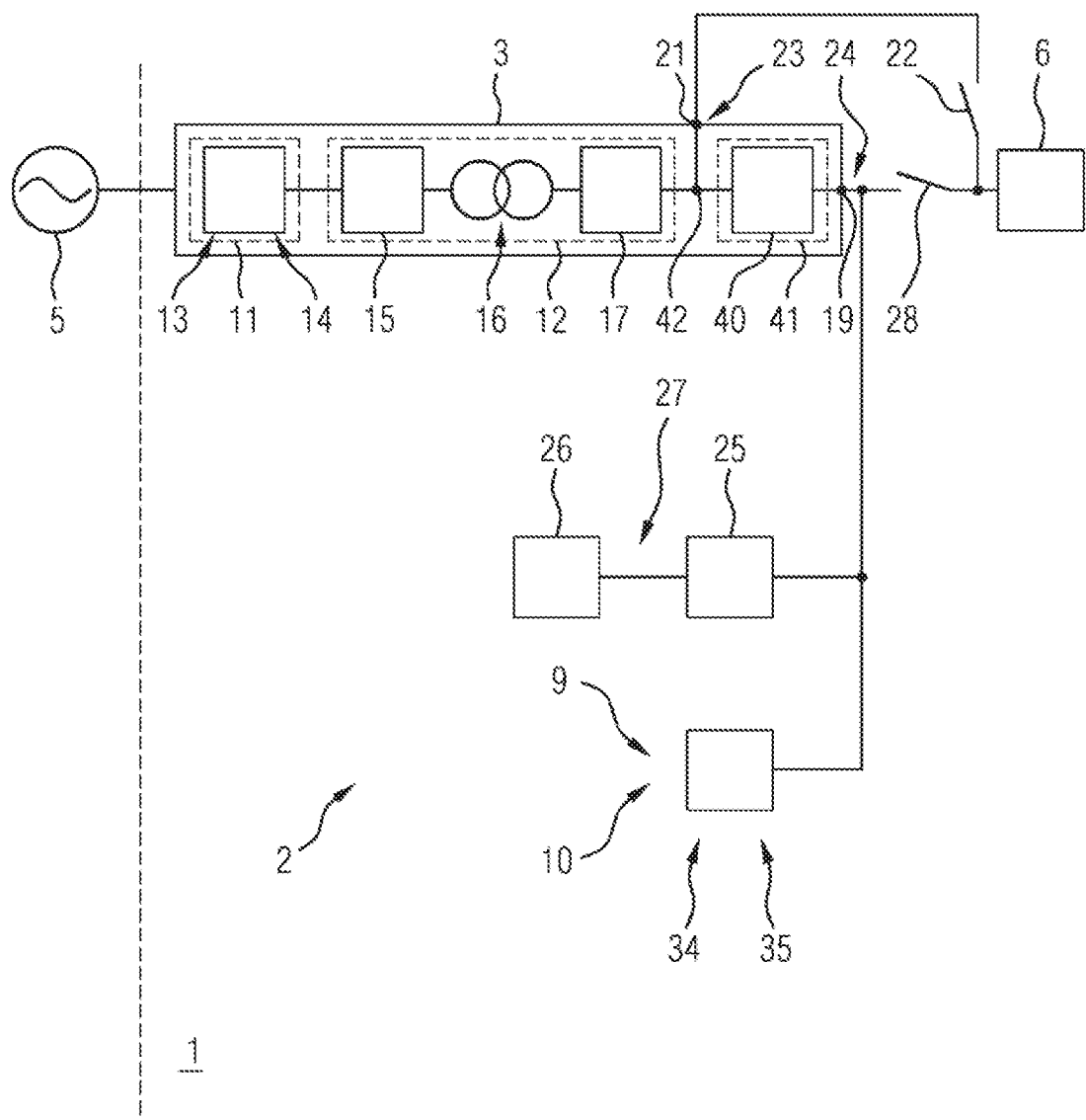
FIG. 5 shows a schematic depiction of a high-voltage vehicle electrical system with a storage-battery charging device, wherein the storage-battery charging device has a DC-DC voltage converter in a third stage.

FIG. 5 shows a further exemplary embodiment of the high-voltage vehicle electrical system 2. According to a less preferred embodiment, the storage-battery charging device 3 has a third stage 41. The third stage 41 is arranged between the second stage 12 and the output connection 19. According to the exemplary embodiment, the third stage 41 of the storage-battery charging device 3 has a DC-DC voltage converter 40. According to the exemplary embodiment, the DC-DC voltage converter 40 is arranged between the rectifier 17 of the second stage 12 and the output connection 19. According to the exemplary embodiment, the second stage 12 and the third stage 41 have a connecting point 42 arranged between them. The second stage 12 and the third stage 41 are then electrically connected only via the connecting point 42. According to the exemplary embodiment, the voltage matching from the first DC voltage 23 to the second DC voltage 24 is performed only by the DC-DC voltage converter 40 of the third stage 41.

LIST OF REFERENCE SIGNS 1 motor vehicle
2 high-voltage vehicle electrical system
3 storage-battery charging device
4 charging connection
5 AC voltage source
6 high-voltage storage battery
7 DC voltage charging connection
8 DC voltage source
9 traction inverter
10 traction unit
11 first stage
12 second stage
13 rectifier of the first stage
14 power factor correction filter
15 inverter
16 transformer
17 rectifier of the second stage
18 capacitor
19 output connection
20 intermediate point
21 supply connection
22 supply switch
23 first DC voltage
24 second DC voltage
25 low DC-DC voltage converter
26 low-voltage load
27 low voltage
28 first switch
29 second switch
30 AC voltage switch
31 DC voltage switch
32 first vehicle electrical system branch
33 second vehicle electrical system branch
34 heating unit
35 air-conditioning compressor
36 third switch
37 low-voltage storage battery
38 fourth switch
39 fifth switch
40 DC-DC voltage converter
41 third stage
42 connecting point

The invention claimed is:

1. A storage-battery charging device for arrangement in a motor vehicle, the storage-battery charging device comprising:
   a first stage having a power factor correction filter;
   a second stage having an inverter;
   an intermediate node electrically connecting said first stage with said second stage; and
   a supply connection for DC voltage directly electrically connected to said intermediate node and configured for direct electrical coupling to a high-voltage vehicle electrical system of the motor vehicle; and
   said second stage having three phases and said intermediate node being electrically connected only to one phase of said three phases.

2. The storage-battery charging device according to claim 1, wherein said intermediate node is electrically connected directly to said inverter of said second stage.

3. The storage-battery charging device according to claim 1, wherein said second stage is electrically connected to an output connection on a side of said second stage that is remote from said intermediate node, wherein said second stage is configured to provide a second DC voltage, different from a first DC voltage, while said intermediate node is coupled to the first DC voltage.

4. The storage-battery charging device according to claim 1, wherein said first stage has a rectifier connected upstream of said power factor correction filter with reference to said intermediate node.

5. The storage-battery charging device according to claim 1, wherein said second stage has a transformer connected downstream of said inverter with reference to said intermediate node, and/or said second stage has a rectifier connected downstream of said inverter with reference to said intermediate node.

6. The storage-battery charging device according to claim 1, wherein a side of said first stage that is remote from said intermediate node is electrically connected to a charging connection for AC voltage, and wherein said charging connection is configured to be electrically connected directly to a motor-vehicle-external AC voltage source.

7. The storage-battery charging device according to claim 1, further comprising a capacitor electrically connecting said first stage and said second stage, and wherein said intermediate node is connected between said capacitor and said second stage.

8. A high-voltage vehicle electrical system for a motor vehicle, comprising an on-board storage-battery charging device according to claim 1.

9. The high-voltage vehicle electrical system according to claim 8, wherein the supply connection of the storage-battery charging device is electrically connected directly to a supply switch of the high-voltage vehicle electrical system, and wherein the supply switch is configured for supplying a DC voltage.

10. The high-voltage vehicle electrical system according to claim 9, wherein said supply switch is electrically connected directly to a high-voltage storage battery of the high-voltage vehicle electrical system.

11. The high-voltage vehicle electrical system according to claim 10, comprising a high-voltage vehicle electrical system branch containing at least one high-voltage load, and wherein said supply switch is electrically connected directly to said high-voltage vehicle electrical system branch with the at least one high-voltage load.

12. A storage-battery charging device for arrangement in a motor vehicle, the storage-battery charging device comprising:
   a first stage having a power factor correction filter;
   a second stage having an inverter;
   an intermediate node electrically connecting said first stage with said second stage; and
   a supply connection for DC voltage directly electrically connected to said intermediate node and configured for direct electrical coupling to a high-voltage vehicle electrical system of the motor vehicle; and
   said second stage having three phases, and said intermediate node is electrically connected to at least two phases of said three phases.

13. The storage-battery charging device according to claim 12, wherein said intermediate node is electrically connected directly to said inverter of said second stage.

14. The storage-battery charging device according to claim 12, wherein said second stage is electrically connected to an output connection on a side of said second stage that is remote from said intermediate node, wherein said second stage is configured to provide a second DC voltage, different from a first DC voltage, while said intermediate node is coupled to the first DC voltage.

15. The storage-battery charging device according to claim 12, wherein said first stage has a rectifier connected upstream of said power factor correction filter with reference to said intermediate node.

16. The storage-battery charging device according to claim 12, wherein said second stage has a transformer connected downstream of said inverter with reference to said intermediate node, and/or said second stage has a rectifier connected downstream of said inverter with reference to said intermediate node.

17. The storage-battery charging device according to claim 12, wherein a side of said first stage that is remote from said intermediate node is electrically connected to a charging connection for AC voltage, and wherein said charging connection is configured to be electrically connected directly to a motor-vehicle-external AC voltage source.

18. The storage-battery charging device according to claim 12, further comprising a capacitor electrically connecting said first stage and said second stage, and wherein said intermediate node is connected between said capacitor and said second stage.

19. A high-voltage vehicle electrical system for a motor vehicle, comprising an on-board storage-battery charging device according to claim 12.

20. The high-voltage vehicle electrical system according to claim 19, wherein the supply connection of the storage-battery charging device is electrically connected directly to a supply switch of the high-voltage vehicle electrical system, and wherein the supply switch is configured for supplying a DC voltage.

* * * * *